United States Patent [19]

Piacenti et al.

[11] Patent Number: 4,499,146
[45] Date of Patent: Feb. 12, 1985

[54] PROTECTING MATERIALS SUBJECT TO DEGRADATION BY ATMOSPHERIC AND POLLUTING AGENTS BY MEANS OF PERFLUOROPOLYETHERS

[75] Inventors: Franco Piacenti, Florence; Federigo Ciampelli; Adolfo Pasetti, both of Milan, all of Italy

[73] Assignees: Montedison S.p.A., Milan; Consiglio Nazionale Delle Ricerche, Rome, both of Italy

[21] Appl. No.: 555,401

[22] Filed: Nov. 28, 1983

Related U.S. Application Data

[63] Continuation of Ser. No. 503,736, Jun. 13, 1983, abandoned, which is a continuation of Ser. No. 352,018, Feb. 24, 1982, abandoned.

[30] Foreign Application Priority Data

Feb. 24, 1981 [IT] Italy ................................ 19933 A/81

[51] Int. Cl.$^3$ ...................... B32B 27/00; C14C 9/00
[52] U.S. Cl. ..................................... 428/422; 252/384; 428/540
[58] Field of Search .................. 427/421, 393.6, 429, 427/136; 524/422, 140; 252/384; 428/422, 540

[56] References Cited

U.S. PATENT DOCUMENTS

| | | | |
|---|---|---|---|
| 3,795,533 | 3/1974 | Gavri | 428/540 X |
| 4,085,137 | 4/1978 | Mitsch et al. | 428/422 X |
| 4,321,177 | 3/1982 | Wilkinson | 427/421 X |
| 4,327,139 | 4/1982 | Shaefer et al. | 428/422 X |

*Primary Examiner*—Michael R. Lusignan

[57] ABSTRACT

Marble, stones, tiles and articles manufactured from such materials are protected from the degrading action of atmospheric and polluting agents by applying to the surfaces of said materials and manufactured articles, a protecting agent which is a perfluoropolyether as such or diluted with a solvent or a mixture of solvents having a boiling temperature lower than 80° C., preferably a fluorochlorohydrocarbon.

7 Claims, No Drawings

PROTECTING MATERIALS SUBJECT TO DEGRADATION BY ATMOSPHERIC AND POLLUTING AGENTS BY MEANS OF PERFLUOROPOLYETHERS

BACKGROUND OF THE INVENTION

This is a continuation of application Ser. No. 503,736 filed June 13, 1983, now abandoned, which in turn is a continuation of Ser. No. 352,018 filed Feb. 24, 1982 and now abandoned.

As is known, the degradation of building materials such as marble, stones, tiles, and of the decorative and artistic handworks or manufactured articles (friezes, colonnades, statues, etc.), constructed from such materials, is caused by two different kinds of phenomena: chemical phenomena and physical phenomena, both occurring in the presence of water.

A physical phenomenon affecting all of the building materials is the one due to the succession of frosting and defrosting or thawing of the water absorbed by the material, due to its porosity and which involves variations in the specific volume and tensions capable of causing fractures or, in any case, reciprocal detachment of the individual particles composing the material.

Another physical phenomenon consists in the dissolution in water of the limestone present in the marbles as essential component, and in the stones as binder, with consequent loss of cohesion of the granules.

Even more important for the degradation of the materials and manufactured articles exposed to the air is the chemical phenomena which essentially consist in the aggression of the carbonate parts of the material or of the manufactured article by the polluting agents present in the air (carbon dioxide, sulphur dioxide, nitrogen oxide, hydrochloric acid, hydrogen sulfide); such pollutants react with the material in the presence of water and their concentration is particularly high at the beginning of rain.

It is known too that, with a view to eliminating or at least meaningfully reducing the above-mentioned drawbacks, it is necessary to markedly decrease the penetration velocity of water from the outside to the inside of the material to be protected.

To achieve this purpose, chemical compounds exerting a water-repellent action are usually applied on the outer surface of the material to be protected.

The protecting compound, in order to be capable of exerting the desired action and to avoid, simultaneously, any collateral degrading phenomena or, it may be, any undesired side phenomena, must possess the following essential characteristics:
  A. chemical inertia toward the material to be protected;
  B. low volatility;
  C. chemical stability in general and in particular to the atmospheric agents, to light and to heat;
  D. transparency and absence of color;
  E. insolubility in the common organic solvents;
  F. permeability to air and to water vapor;
  G. capability of retaining, in the long run, its own characteristics of solubility, to secure the possibility of removing it from the material and thus the reversibility of the treatment.

As is also known, film-forming substances such as glues, drying oils, resins and polymerizable substances are often utilized for the protection of the materials. Such products—which are chiefly employed in the restoration of monuments and of manufactured articles in order to utilize the "consolidating" properties thereof in the event that the degradation should be at such an advanced stage as to require the consolidation of fractures or of parts of material which have lost the natural cohesion among the particles—besides being generally unstable to chemical agents and to sunlight, drastically reduce the permeability of the treated surfaces to air and to water vapor.

Thus, extremely marked phenomena of decohesion occur in the stones under the impermeable film due to the action of entrapped water.

Other products which are presently employed—besides the film-forming or polymerizable products—are waxy or oily substances such as natural oils or waxes, and organic and organometallic products, such as silicones.

All these products possess a low stability to chemical agents and to sunlight and, therefor, are subject, in the course of time, to yellowing or decoloration thus altering the color of the material and to loss of impermeabilizing properties as their chemical structures alter.

From the foregoing, it will be apparent that both the film-forming substances and the waxy or oily substances employed so far in the protection of the materials and manufactured articles exposed outdoors are not suited to the purpose for which they are used because they do not possess all of the required characteristics. Furthermore, the necessity of obviating both the inadequacy and the drawbacks exhibited by the conventional treatments will be apparent.

THE PRESENT INVENTION

One object of the present invention is to provide a process for protecting marble, stones, tiles and articles manufactured from such materials from degradation due to atmospheric agents and pollutants, and which avoids the drawbacks and disadvantages of the known process and meets all of the above-listed requirements A to G, inclusive.

This and other objects are achieved by the invention in accordance with which there is applied to the surface of said materials and manufactured articles a protective coating comprising a fluid perfluoropolyether, such as, for example, "Fomblin" (produced by Ausimont S.p.A., Milan, Italy, and having the general formula:

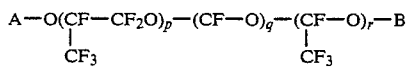

or the general formula:

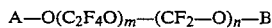

wherein p, q and r are integers, q and r may be equal to zero, the sum p+q+r being a number ranging from 5 to 250, m and n are integers, n may be equal to zero, the sum m+n being a number ranging from 10 to 1000, and A and B are perfluoroalkyl radicals containing from 1 to 3 carbon atoms.

Said fluid perfluoropolyethers are applied as such or diluted with a solvent or a mixture of solvents having a boiling point below 80° C., preferably a fluorochlorohydrocarbon.

The application of such fluid perfluoropolyethers onto the surface of the material or manufactured article to be protected may be effected according to any technique usually employed for such purpose: by brushing, by means of a spray gun, or by other spraying methods.

The fluid perfluoropolyethers may be employed as such or, often preferably, diluted in a suitable chlorofluorinated solvent which permits a better penetration of the fluid into the pores of the material and which has a sufficiently low boiling point as to rapidly evaporate after application. Particularly suitable for the purpose are the chlorofluorohydrocarbons such as trichloro-trifluoroethane, (e.g., "Algofrene 113" produced by Ausimont S.p.A., Milan, Italy) for brush or spray applications, and the mixtures of trichlorofluoromethane ("Algofrene A 11") and dichlorodifluoromethane ("Algofrene A 12") for spray applications.

The concentrations of the perfluoropolyether solutions to be employed for the purpose of this invention may range from 100% of perfluoropolyether to 5% of perfluoropolyether, the solvent being selected from among those indicated hereinabove.

The amount of protecting agent to be applied per surface unit of the material to be protected is selected as a function of the porosity of the material, the higher the porosity, the greater the amount of protecting fluid to be applied per surface unit.

The advantages offered by the use of the fluids according to the present invention in respect of the use of the conventional protective products utilized heretofore are the following:

(1) said fluids are chemically inert substances, permanently stable and resistant to the most active and aggressive chemical agents, such as chlorine, fluorine, acids, alkalis, and consequently are resistant to the atmospheric pollutants;

(2) they are substances stable to heat up to 300° C., which remain fluid until −70° C., and therefore are insensible even to extreme values of room temperature;

(3) their surface tension is low, which favors their penetration along the walls of even the smallest pores of the material to be treated, without clogging said pores;

(4) they are fully water-repellant substances, such feature being essential for the protection of the materials and manufactured articles exposed to the atmospheric and polluting agents;

(5) they are oil-repellant and immiscible with the common organic solvents, and thus act as a barrier to the pollution of the material by residues of oils of the hydrocarbon type present in the atmosphere;

(6) they are soluble in only a few fluorinated or chlorofluorinated solvents which may be employed as diluents for the purpose of a better application onto the surface to be treated or also for removing the protective product from the treated surface, so rendering the treatment fully reversible;

(7) they are permeable to the air and water vapor, thus allowing the controlled aeration, humidifacation, and dehumidification of the inner layers of the treated material;

(8) because they possess a very low vapor tension they do not volatilize but stably remain on the treated material;

(8 ) they are stable and transparent to U.V. light radiations, do not alter due to exposure to sunlight, and do not modify the original color of the material.

The following examples are given to illustrate the present invention in more detail and are not intended to be limiting.

EXAMPLE 1

There were utilized two specimens of "Serena" stone of the same composition, having the shape of a cube with side of 70 mm.

One of the two specimens was superficially treated with a perfluoropolyether commercially available as "Fomblin Y R" (trademark of Ausimont), having a kinematic viscosity of 1,000 cSt and an average molecular weight of 6,000, while the other specimen was left as such.

Perfluoropolyether was applied by diluting the same fluid to 50% with trichlorotrifluoroethane and by using a compressed air sprayer, so as to cause an amount of protective fluid equal to 60 g/m$^2$ to deposit onto the specimen surfaces.

The penetration rate of the water was determined on both specimens after seven days. Such measurement was carried out by applying to a face of the specimen a device consisting of a glass cylinder filled with water and connected to a graduated micropipette allowing the measurement of the water amount absorbed by the surface in contact with the specimen. Such device is described more in detail in the document published by the group Unesco—Rilem PEM, No. 78/182. The reading of the water absorbed was effected at prefixed intervals of time and the quantity read was expressed in microliters/cm$^2$ of surface.

In the treated specimen, the microliters of water absorbed per cm$^2$ were 2.5 after 10 minutes, 5.8 after 20 minutes and 8.3 after 30 minutes; in the untreated specimen, the absorbed amounts were, conversely, 6.8 after 10 minutes, 17.4 after 20 minutes and 27.0 after 30 minutes.

From the comparison between the two specimens it is apparent that the surface treatment with the protecting agent strongly reduces the penetration rate of the water into the interior of the stone.

EXAMPLE 2

Example 1 was repeated but using two specimens having sizes like those specified, but consisting of Carrara "Marble for statues".

The measurements of the water penetration rates, effected according to the same method as described in Example 1, gave the following results: in the treated specimen, the water absorbed per cm$^2$ was equal to 0.0 microliter after 5 minutes, to 0.3 microliter after 10 minutes, to 0.9 microliter after 20 minutes and to 3.8 microliters after 120 minutes; in the untreated specimen, conversely, the absorbed amounts were 4.4 microliters after 5 minutes, 7.0 microliters after 10 minutes, 12.2 microliters after 20 minutes and 51.2 microliters after 120 minutes.

From the comparison between the two specimens it results that the protective surface treatment considerably reduced the penetration rate of the water also in a material having a porosity remarkably different from that of the "Serena" stone.

EXAMPLE 3

The specimens of Examples 1 and 2 were kept outdoors for two years. The tests to determine the water penetration rate were repeated, according to the method described in Example 1, every six months: no meaningful differences from the initial results specified in Examples 1 and 2 were ascertained. These tests prove that the effectiveness of the treatment according to this invention lasts for not less than two years.

EXAMPLE 4

A flat surface of "Serena" stone was treated with the perfluoropolyether "Fomblin Y R" having the characteristics described in Example 1, diluted with trichlorotrifluoroethane (70 parts of perfluoropolyether and 30 parts of solvent) by brush-treatments until an amount of protective agent equal to 80 g/m² had deposited on the surface.

After two days, by using a microsyringe, a drop of distilled water having a volume of 5 microliters was deposited onto the treated surface. 10 and 20 seconds, respectively, after deposition of the drop, the contact angle was measured by utilizing a photographic enlargement. Such angles were 63° and 56°, respectively.

Analogous measurements on another specimen of the same stone not treated with the protective agent yielded values of, respectively, 9° after 10 seconds and not determinable (due to absorption) after 20 seconds. This test proved the water-repellent power imparted by the treatment to the stone surface.

EXAMPLE 5

Example 4 was repeated, employing a perfluoropolyether having structure $CF_3O(C_2F_4O)_m(CF_2O)_n-CF_3$, wherein m/n=0.8 and having a kinematic viscosity of 250 cSt and an average molecular weight of 15,000. The perfluoropolyether was diluted, before being applied to the surface of "Serena" stone, with trichlorotrifluoroethane in the ratios specified in Example 4.

Contact angles of 26° and 24° were measured 10 seconds and 20 seconds, respectively, after deposition of the drop.

EXAMPLE 6

Example 4 was repeated, but utilizing, as material to be protected, a flat surface of Carrara "Marble for statues". Contact angles of 102° and of 95° were measured 10 seconds and 20 seconds, respectively, after deposition of the drop.

Analogous measurements effected on another specimen of the same stone not treated with the protective agent according to this invention yielded values of 30° and 20° after 10 seconds and 20 seconds, respectively, from deposition of the drop.

EXAMPLE 7

Specimens of "Serena" stone and of Carrara "Marble for statues" were treated with a perfluoropolyether commercially available under the trademark "Fomblin Y R", having the characteristics described in Example 1, by using the spray technique. To such purpose there was prepared a cylinder filled with 5% of perfluoropolyether and with 95% of a mixture (in equal parts) of trichlorofluoromethane and dichlorodifluoromethane. The application was repeated till reaching an amount of protective agent deposited on the specimen surface equal to 60 g/m².

The specimens were then subjected to U.V. radiation by a 15 watt medium pressure mercury-vapor lamp "Phillips". The specimens were placed at a distance of 30 cm from the lamp and radiation was continued for 2 hours at a temperature of 40° C. After such test, no change in the natural color of the treated surface was observed, nor were traces of alteration products (for example fluorite) detected by means of X-ray diffractometric analyses.

COMPARATIVE EXAMPLE A

Example 7 was repeated by treating the surface of the specimens with a non-fluorinated protective agent, generally utilized for the protection of the stone, and more precisely with a product consisting of a hydrocarbon emulsion of a quaternary ammonium base. Also in this case the amount of protective agent deposited on the surface of the specimens was equal to 60 g/m². After radiation conducted according to the modalities described in Example 7, an evident yellowing of the treated surfaces was observed.

COMPARATIVE EXAMPLE B

A "Serena" stone specimen of cubic shape, having sides of 70 mm was treated with the same commercial hydrocarbon solution described in Comparative Example A. The measurement of the permeability to water after seven days, carried out as described in Example 1, gave the following result: 8.5 microliters after 30 minutes. After exposure to the atmospheric agents for two years, the same measurement carried out on the same specimen yielded the following result: 28 microliters after 30 minutes, which indicates complete loss of the protective power of the treatment.

What we claim is:

1. A process for protecting marble, stones, tiles and articles manufactured from such materials from the degrading action caused by atmospheric agents and pollutants, which comprises applying to the surfaces of said materials and manufactured articles a protective coating comprising, as essential protective agent, a fluid perfluoropolyether having at least one of the following general formulae:

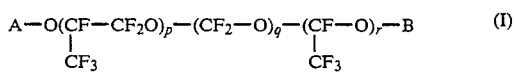

and

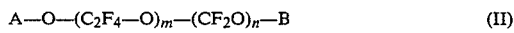

wherein p, q and r are integers, q and r may be equal to zero, the sum p+q+r is an integer from 5 to 250, m and n are integers, n may be equal to zero, the sum m+n is an integer from 10 to 1000, A and B are perfluoroalkyl radicals containing 1 to 3 carbon atoms, said fluid perfluoropolyether being applied as such or diluted with a solvent or mixture of solvents having a boiling temperature below 80° C.

2. The process of claim 1 in which the fluid perfluoropolyether has formula (I).

3. The process of claim 1 in which the fluid perfluoropolyether has formula (II).

4. The process of claim 1 in which the diluent for the perfluoropolyether is at least one fluorochlorohydrocarbon.

5. The process of claim 4, in which the diluent is trichlorotrifluoroethane.

6. The process of claim 4, in which the diluent is trichlorotrifluoromethane.

7. The process of claim 4, in which the diluent is a mixture of trichlorotrifluoromethane and dichlorodifluoromethane.

* * * * *